Figure 8:
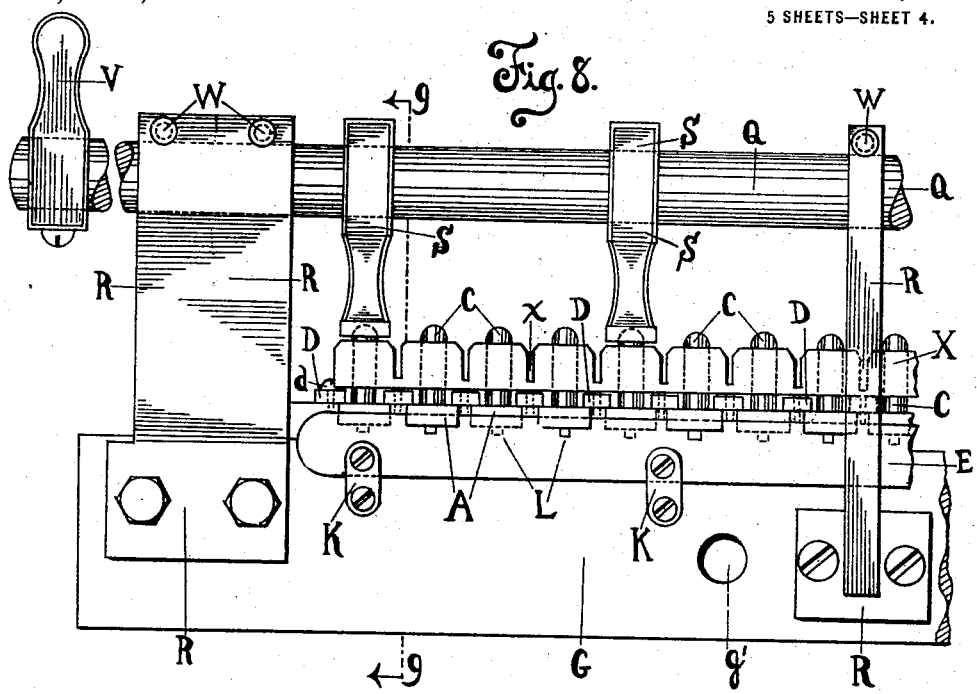

A. C. ZENORINI.
NEEDLE MECHANISM FOR EMBROIDERY MACHINES.
APPLICATION FILED DEC. 31, 1914.
Patented Oct. 31, 1916.
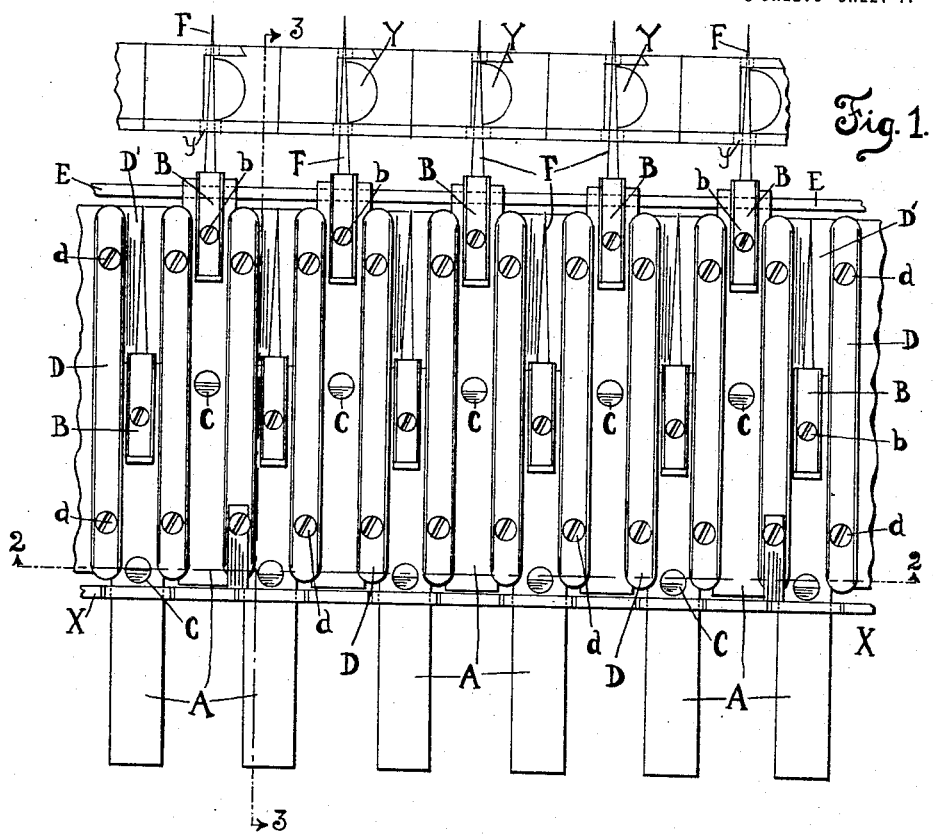
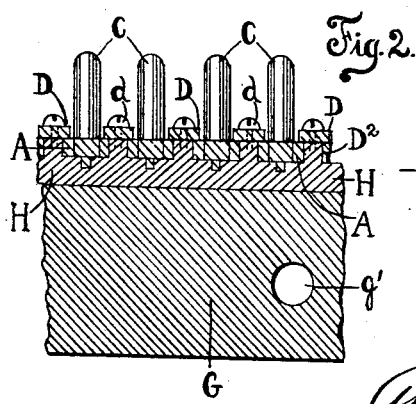
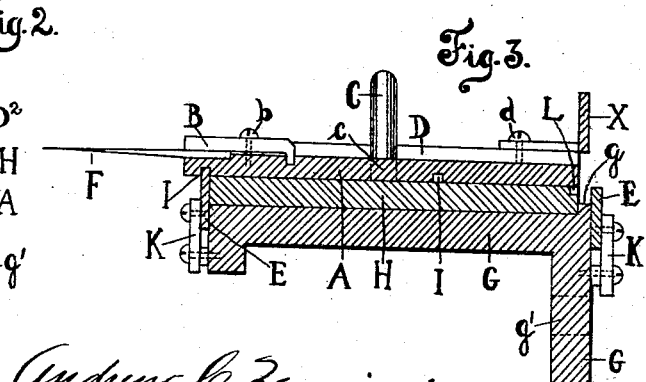
WITNESSES:
INVENTOR.
BY
ATTORNEYS.

A. C. ZENORINI.
NEEDLE MECHANISM FOR EMBROIDERY MACHINES.
APPLICATION FILED DEC. 31, 1914.
1,203,447.
Patented Oct. 31, 1916.
5 SHEETS—SHEET 2.
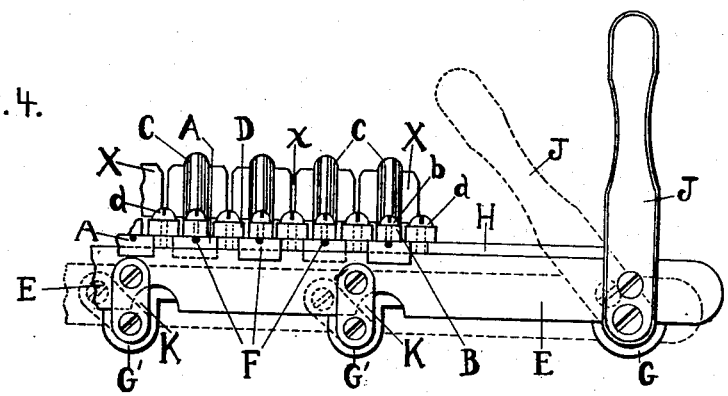
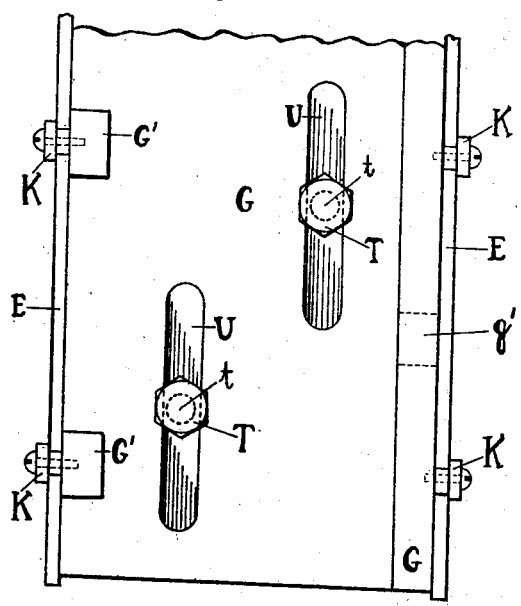

A. C. ZENORINI.
NEEDLE MECHANISM FOR EMBROIDERY MACHINES.
APPLICATION FILED DEC. 31, 1914.
1,203,447.
Patented Oct. 31, 1916.
5 SHEETS—SHEET 3.
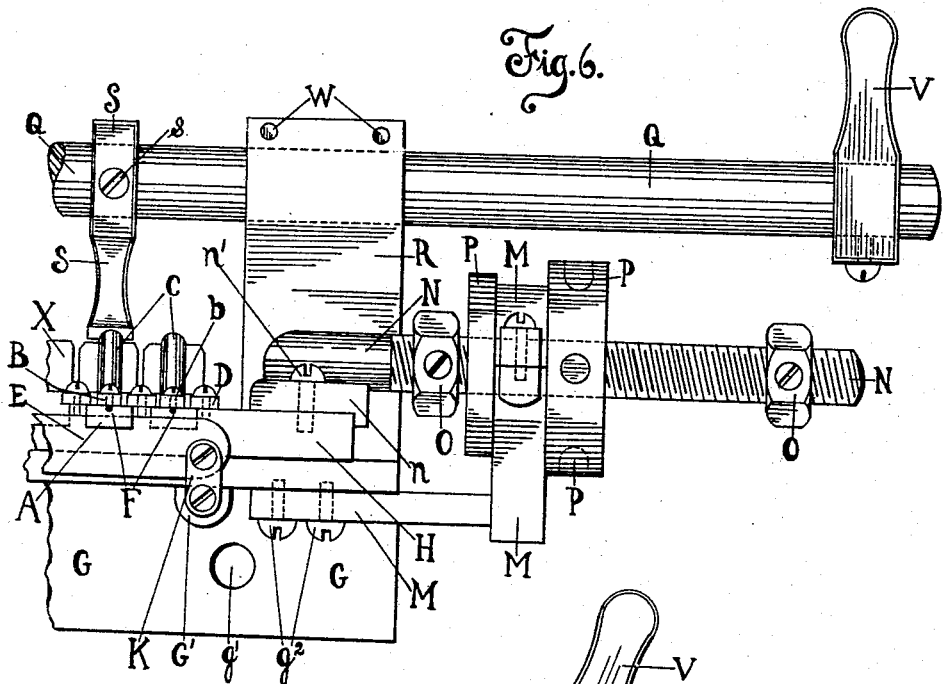
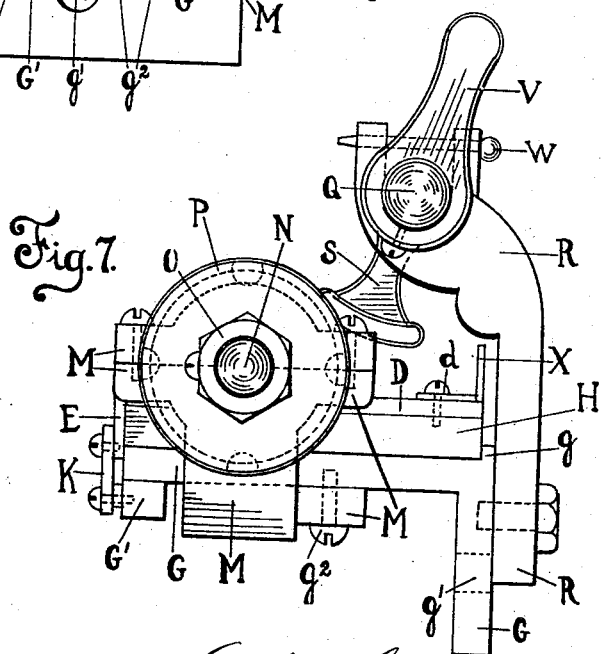

A. C. ZENORINI.
NEEDLE MECHANISM FOR EMBROIDERY MACHINES.
APPLICATION FILED DEC. 31, 1914.

1,203,447.

Patented Oct. 31, 1916.
5 SHEETS—SHEET 4.

WITNESSES:

INVENTOR.

BY

ATTORNEYS.

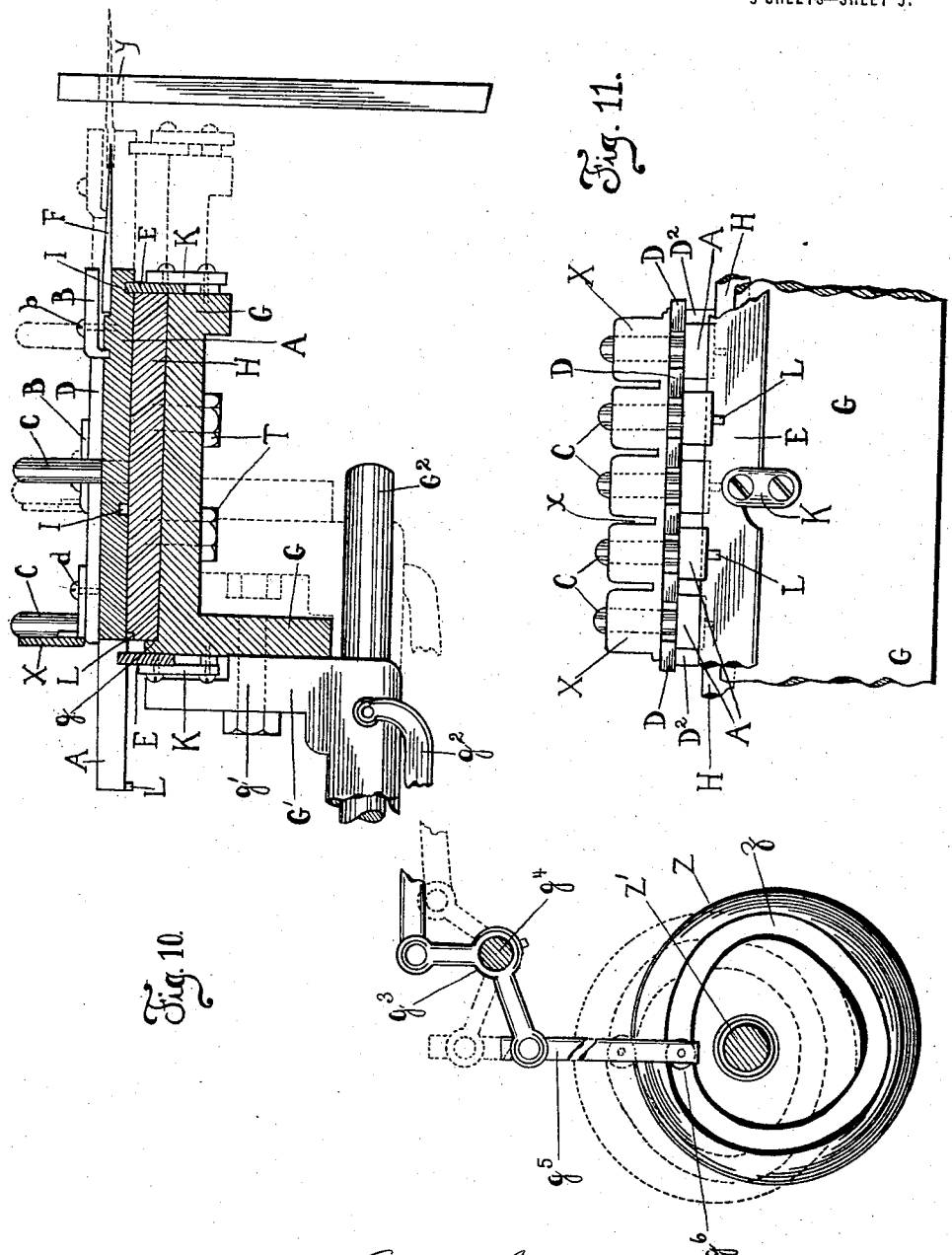

UNITED STATES PATENT OFFICE.

ANDREW C. ZENORINI, OF WEST HOBOKEN, NEW JERSEY.

NEEDLE MECHANISM FOR EMBROIDERY-MACHINES.

1,203,447.   Specification of Letters Patent.   Patented Oct. 31, 1916.

Application filed December 31, 1914. Serial No. 879,968.

*To all whom it may concern:*

Be it known that I, ANDREW C. ZENORINI, a subject of the King of Italy, and a resident of West Hoboken, in the county of Hudson and State of New Jersey, have invented certain new and useful Improvements in Needle Mechanism for Embroidery-Machines, of which the following is a specification.

This invention relates to improvements in needle mechanism for embroidery machines. By the use of my invention I am enabled with great rapidity to produce embroidery designs in a plurality of colors with uniformity of color in relation to the design to be produced and without the rethreading of needles as was heretofore possible; I may have in one design and operating through the agency of one shuttle or shuttle hole any desirable number of needles each threaded with a different shade or color of thread and I may change from one color or shade to another almost instantly and without the usual rethreading of needles, resulting in the saving of the time and labor of the operator and permitting a vastly greater amount of colored design work to be accomplished by a single machine than has heretofore been possible.

Another feature of my invention consists in the provision of means enabling the operator to throw into operative position almost instantly and by simple operations one series of needles and to lock the same into such operative position, and with the same means and with equal speed the operator is enabled to throw out of operation another series of needles, and the needles so thrown out of operation may also be locked in inoperative position.

Another feature of my invention consists in the mounting of needles in a series of independently movable needle carriers each movable freely forwardly into operative position and rearwardly out of operative position without the use of springs or the like; means for moving a series of said needles simultaneously into or out of operative position; means for simultaneously locking a complete series in operative position and means for simultaneously shifting the series of needles actuated into operative position laterally into alinement with the shuttle hole of the machine and means for independently locking the series of reserved needles in inoperative position.

Figure 9:
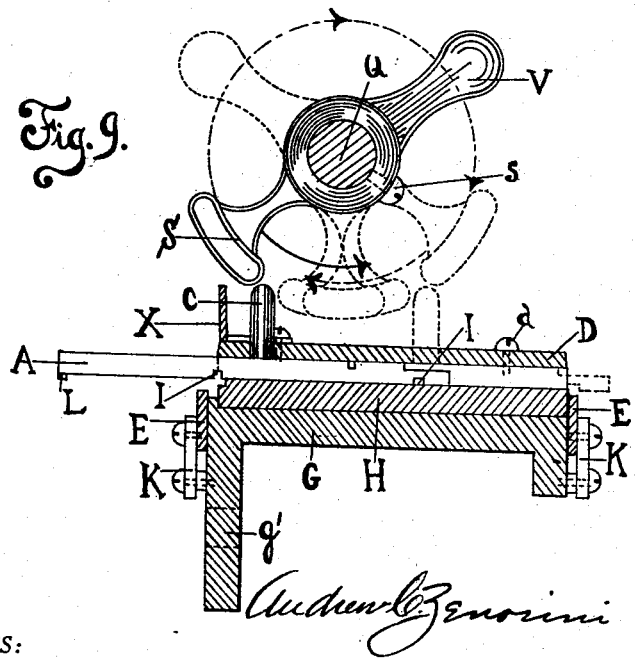

In the accompanying drawings in which similar reference characters designate corresponding parts throughout the several views, Figure 1 is a plan view of a portion of needle mechanism embodying my invention, the carrier shifting mechanism being omitted; Fig. 2 is a view taken on the line 2—2 of Fig. 1 showing one end of the needle bar; Fig. 3 is a section on the line 3—3 of Fig. 1, the shuttle and guides being omitted; Fig. 4 is a front elevation at one end of my needle mechanism showing my preferred mechanism for locking the needle carriers in either operative or inoperative position; Fig. 5 is a view in plan of the reverse side of my improved needle mechanism; Fig. 6 is a side elevation of one end of my improved needle mechanism, showing my preferred means for shifting carriers out of and into operative position, and also for moving the same laterally into alinement with the shuttle holes; Fig. 7 is an end elevation of the devices shown in Fig. 6; Fig. 8 is a side elevation partly in section, viewed from the side opposite to that of Fig. 6; and Fig. 9 is a section on the line 9—9 of Fig. 8; Fig. 10 is a section of needle mechanism and needle plate with the operating parts of the needle mechanism; and Fig. 11 is an end elevation showing my movement limiting plate for the carriers provided with thread slots, and also showing the parts contiguous to said plate.

Referring now to these drawings, F indicates the needles of an embroidery machine mechanism each of which is suitably mounted in a needle carrier A by means of a pressure clip B to which pressure is applied by means of a screw $b$. Each of the needle carriers A is independently mounted to slide freely and without spring pressure or the like rearwardly and forwardly in slideways D' formed on a laterally movable shift bar H and intermediate guide bars $D^2$, said carriers being retained within such slideways by retaining strips D secured to the guide bars by screws $d$ or in any other suitable manner. The guide bars $D^2$ may be welded or otherwise secured to the shift bar H or may be formed integrally therewith.

The shift bar H is mounted to have lateral or side wise movement on a relatively stationary supporting or bed plate G which is preferably channeled or grooved on its upper surface to form a rib $g$ at one edge and said supporting plate is connected by bolts $g'$ to a reciprocating bracket $G'$ which is mounted on a rod $G^2$ suitably secured to the frame, and said bracket is pivotally connected by link $g^2$ to one arm of an angular rocking lever $g^3$, which is pivoted on a shaft $g^4$ and has its other arm pivotally connected to a vertical rod $g^5$ provided at its lower end with a roller $g^6$ running in a groove $z$ in a cam wheel Z which is rotated by a shaft $Z'$ from any suitable source of power. The cam groove $z$ is such that it imparts to the reciprocating bracket an initial movement of the needle through the shuttle hole, then a slight backward movement to loop the thread of the needle so as to permit the passage of the shuttle therethrough, and a final movement through such hole and back again to complete a stitch.

Suitable means for moving the needle carriers rearwardly and forwardly in their slideways is preferably provided so that one series of needles may be moved into operative position, as shown in Fig. 1; and another series of needles may be moved into reserved position as shown in said figure, and for this purpose I preferably provide each of such independently movable carriers with a vertically projecting pin C secured in the carrier by a screw threaded at the lower end $c$ thereof; or in any other suitable manner, and I furthermore preferably provide means for engaging and moving rearwardly or forwardly as may be desired a series of such vertically projecting pins. My preferred means for engaging the pins and moving the needle carriers consists of a removably mounted and laterally shiftable carrier-shifting shaft comprising a cylindrical rod Q rocked by means of a lever V (see Figs. 6 to 9) which is mounted in suitable bearings R and extends longitudinally over the needle carriers. Suitably keyed to said bar by means of screws $s$ or in any other suitable way are a plurality of what I shall term hammers S which are suitably spaced on the bar to engage and move into or out of operative position as desired a series of needle carriers. I preferably provide a plurality of such bars each provided with a series of hammers in suitably spaced relations so that I may readily and quickly engage and move either every alternate needle out of engagement as shown in Fig. 1, in which is illustrated what is commonly called a four-quarter machine, or I may move every third needle into operative position in what is commonly called a six-quarter machine, or I may move every fourth needle into operative position in what is called an eight-quarter machine and so on, the other needles which may consist of one or more series threaded in different colors being, of course, moved rearwardly out of operative position. The said shaft Q is preferably retained in the bearings R by means of pins W when in use.

Suitable means for locking the needle-carriers in operative position is preferably provided and as shown comprises a locking strip E disposed longitudinally along the front edge of the shift-bar H and adapted to coöperate with grooves I in the carriers A. (See Figs. 3, 4, 5 and 9). My preferred means for moving the strip E into and out of locking engagement consists of a series of rocking links K pivoted at one end in blocks or projections $G'$ on the supporting or bed plate G and pivoted at the other end to the strip E. An operating lever J for rocking the links K is provided at the end of the machine. Obviously when the lever is moved from the position shown in full lines to the dotted line position (Fig. 4) the strip E will be moved downwardly and out of locking engagement with the needle carriers or slides, whereupon the same may be moved, and upon the movement of the lever in the opposite direction, the links will be rocked and the edge of the strip E will enter the grooves I of such of the carriers A as are in operative position, thus securely locking such needle carriers in such position. Suitable means is also preferably employed for locking the reserved needles in inoperative position and I preferably employ a locking strip disposed along the rear edge of the shift bar mounted and operated in all respects similar to the locking strip E hereinabove described.

My preferred means for shifting and guiding the shift-bar H laterally to bring the desired series of needles into proper alinement with the needle plate holes Y consists in providing suitable guide slots U in the supporting plate G at suitable places along its length and inserting through such slots suitable guide pins $t$ preferably provided with bolt heads T, (see Fig. 5). The said shift-bar is preferably moved laterally by means of a screw shaft N secured at one end to said shift-bar H in any suitable manner such as by the plate $n$ and screw $n'$, the said screw shaft N being threaded in a nut P mounted in a bearing bracket M suitably secured to the supporting plate G by screws $g^2$ or in any other suitable manner. Obviously when the nut P is rotated in one direction the screw shaft N will cause the plate H to be pushed in one direction and when the screw P is rotated in the opposite direction it will cause the plate H to be pulled in the opposite direction. Suitable set nuts O are preferably provided on the screw shaft N to adjust the extent of movement thereof.

It will be seen from the above that I have provided a device in which the needles are mounted upon independently movable needle carriers or slides and that such needles may be threaded, one series in one color, and another series in another color, and that the series of needles may be changed as desired from each alternate needle to each third needle and so on, thus enabling the threading of any desired series with any suitable color and enabling the throwing into action of a series of needles threaded in one color while one or more series of needles threaded in one or more colors may be thrown out of action or held in reserve and any suitable number of needles may be used or operated with the same shuttle and the same needle plate hole by simply shifting the shift bar into proper position. Furthermore, I am enabled with great rapidity by my removable rod Q to shift one series of needle carriers into position and other series out of position, all the series of needles being threaded in suitable colors.

In the preferred form of needle mechanism shown, I preferably provide double the number of needles that may coöperate at one time with the shuttle holes of the most closely positioned machine at present in use, viz., the four-quarter machine.

Suitable means for limiting the forward or rearward movement of the needle carriers is provided and as shown the forward movement is limited by means of a projection L which is adapted to abut against a cut out portion in the shift bar H while the movement rearwardly is limited by the vertical pins C engaging a plate, X disposed along the rear edge of the plate H and secured by suitable screws on the bars D, and this strip X if desired may be provided with guide apertures X (Fig. 11) for the thread.

Having described my invention, I claim:

1. Needle mechanism for embroidery machines embodying therein a suitable reciprocating supporting bar extending parallel to the work and provided with a longitudinal channel on its upper surface, a shift bar extending parallel to said supporting bar and mounted in said channel to move longitudinally of said supporting bar and having a series of transverse grooves in its upper surface, a series of carriers each independently and slidably mounted in said shift-bar grooves, embroidering implements mounted in said carriers, means for reciprocating the supporting bar toward and away from the work, means for shifting the shift-bar in relation to the supporting bar and means for shifting the carriers within the grooves in said shift bar.

2. Needle mechanism for embroidery machines embodying therein a suitable reciprocating supporting bar extending parallel to the work and provided with a longitudinal channel on its upper surface, a shift bar extending parallel to said supporting bar and mounted in said channel to move longitudinally of said supporting bar and having a series of transverse grooves in its upper surface, a series of carriers each independently and slidably mounted in said shift-bar grooves, embroidering implements mounted in said carriers, means for reciprocating the supporting bar toward and away from the work, means for shifting the shift-bar in relation to the supporting bar, means for shifting the carriers within the grooves in said shift bar, means for limiting the movement of said carriers relatively to said shift bar in opposite directions and means for locking said carriers in extreme positions.

3. Needle mechanism for embroidery machines embodying therein a suitable reciprocating supporting bar extending parallel to the work and provided with a longitudinal channel on its upper surface, a shift bar extending parallel to said supporting bar and mounted in said channel to move longitudinally of said supporting bar and having a series of transverse grooves in its upper surface, a series of carriers each independently and slidably mounted in said shift-bar grooves, embroidering implements mounted in said carriers, means for reciprocating the supporting bar toward and away from the work, means for shifting the shift-bar in relation to the supporting-bar, a vertically-disposed pin connected to the upper surface of each carrier for shifting the carriers within said shift-bar grooves, means for limiting the transverse movement of said carriers in opposite directions, and means for locking the carriers in extreme positions.

4. Needle mechanism for embroidery machines embodying therein a suitable reciprocating supporting-bar extending parallel to the work and provided with a longitudinal channel on its upper surface, a shift-bar extending parallel to said supporting bar and mounted in said channel to move longitudinally of said supporting-bar and having a series of transverse grooves in its upper surface, a series of carriers each independently and slidably mounted in said shift-bar grooves, embroidering implements mounted in said carriers, means for reciprocating the supporting bar toward and away from the work, means for shifting the shift-bar in relation to the supporting-bar, a vertically-disposed pin connected to the upper surface of each carrier for shifting the carriers within said shift-bar grooves, means for limiting the movement of said carriers in opposite directions, means for locking the carriers in extreme positions, bearings disposed above said carriers and a revoluble bar removably mounted in said bearings, and a series of contact devices on said bar adapted to engage a series of said pins.

5. Needle mechanism for embroidery machines embodying a plurality of needle carriers, each movable independently of the other; needles mounted in said needle-carriers; a support for said needle-carriers and a revoluble bar removably mounted above said carriers and provided with hammers suitably spaced apart for simultaneously moving a predetermined series of needle-carriers transversely of said support.

6. Needle mechanism for embroidery machines embodying therein a suitable reciprocating supporting bar extending parallel to the work and provided with a longitudinal channel on its upper surface, a shift bar extending parallel to said supporting bar and mounted in said channel to move longitudinally of said supporting bar, a series of carriers each independently mounted to move transversely of said shift-bar, embroidering implements mounted in said carriers, means for reciprocating the supporting bar toward and away from the work, and a manually-operable screw-shaft for shifting and automatically locking the shift bar in relation to the supporting bar.

7. Needle mechanism for embroidery machines embodying therein a plurality of needle carriers, each movable freely and independently of the other; needles mounted in said needle carriers, a support for said needle carriers, a revoluble bar provided with a series of hammers suitably spaced apart for simultaneously moving a predetermined number of needle carriers transversely of said support means for loosely mounting said bar to permit longitudinal movement of the same, and means for revolving said bar and shifting the same longitudinally to bring the spaced hammers into successive engagement with a plurality of series of needle carriers.

8. Needle mechanism for embroidery machines embodying therein a suitable reciprocating supporting bar extending parallel to the work and provided with a longitudinal channel on its upper surface, a shift bar extending parallel to said supporting bar and mounted in said channel to move longitudinally of said supporting bar, a series of carriers each independently and slidably mounted to move transversely of said shift-bar, embroidering implements mounted in said carriers, means for reciprocating the supporting bar toward and away from the work, means for shifting the shift-bar in relation to the supporting bar, means for shifting the carriers transversely of said shift bar, means for limiting the movement of said carriers relatively to said shift bar in opposite directions and an independently-movable locking bar for simultaneously engaging and locking a series of said carriers in relation to the shift bar.

9. Needle mechanism for embroidery machines embodying a plurality of carriers, each movable freely and independently of the other and having alined locking grooves, embroidering implements mounted in said carriers, a support for said carriers, an independent locking bar having a continuous locking edge and movable in a vertical plane into and out of engagement with the said alined grooves and means for moving the same vertically.

In witness whereof, I have signed my name to the foregoing specification in the presence of two subscribing witnesses.

ANDREW C. ZENORINI.

Witnesses:
 Joseph F. O'Brien,
 Normann Hahnel.

Copies of this patent may be obtained for five cents each, by addressing the "Commissioner of Patents, Washington, D. C."